May 4, 1926. 1,583,228
F. C. FRANZEN
BRAKE OPERATING ATTACHMENT FOR MOTOR VEHICLES
Filed July 11, 1924
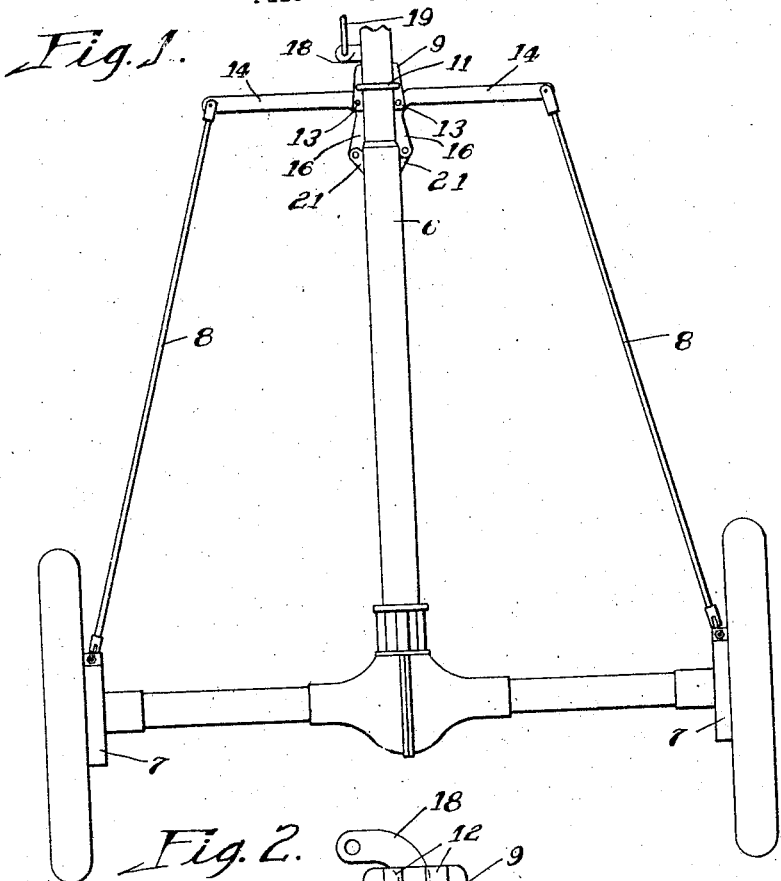
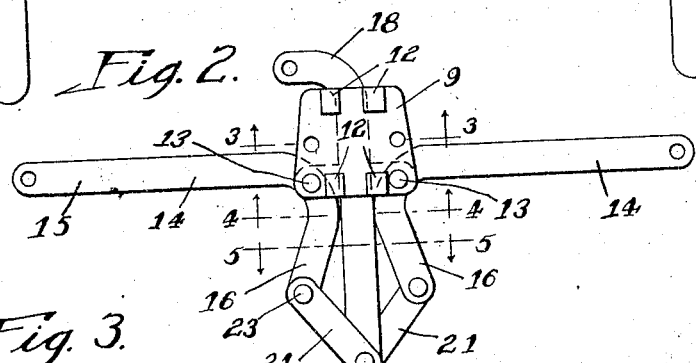
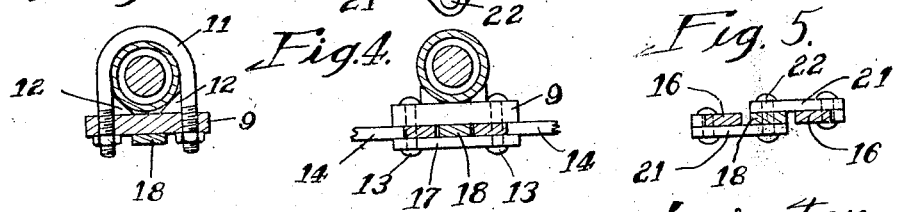
Inventor:
Frank C. Franzen
By Wilson & McGuna
Attys.

Patented May 4, 1926.

1,583,228

UNITED STATES PATENT OFFICE.

FRANK C. FRANZEN, OF ROCKFORD, ILLINOIS.

BRAKE-OPERATING ATTACHMENT FOR MOTOR VEHICLES.

Application filed July 11, 1924. Serial No. 725,321.

*To all whom it may concern:*

Be it known that I, FRANK C. FRANZEN, a citizen of the United States, residing at Rockford, in the county of Winnebago and State of Illinois, have invented certain new and useful Improvements in Brake-Operating Attachments for Motor Vehicles, of which the following is a specification.

This invention relates in general to brakes and has more particular reference to operating means for brakes applied to the driving wheels of a motor vehicle, usually to a drum on the hub of each wheel.

The primary purpose of my invention is to provide an improved brake operating device whereby a powerful brake applying pressure may be exerted with comparatively little manual effort and whereby the brake applying pressure will be equalized in its application to both drive wheels of a motor vehicle. To this end I employ, in the preferred embodiment of my invention an arrangement of brake-connected levers, a manually operable pull rod and a double toggle-joint connection between said rod and levers whereby first movement increasing and then brake pressure increasing and constant equalizing pressure of braking is secured with the pull on said rod.

Another purpose is to provide a brake-operating device of the character described which may be applied as an attachment to practically any motor vehicle for improving the braking facilities thereof.

My invention enables more effective braking action with minimum manual effort and is especially desirable as a safety factor. By this I mean that it enables the driver to bring the vehicle to a stop or to retard its motion quicker and with less effort than with the conventional brake-operating mechanisms acting on the rear wheels. My invention is therefore particularly useful and desirable in its application to motor vehicles used in city driving where frequent and sudden stopping is necessitated by traffic conditions and also in hilly and mountainous country where the brakes are relied upon for safety to an unusual extent.

Still another purpose is to provide a brake-operating attachment of the character described so constructed that it may be easily attached to a motor vehicle and will be durable and practical for the purposes intended, and which, furthermore, may be produced at a comparatively low cost.

Other objects and attendant advantages will be appreciated by those skilled in this art as the invention becomes better understood by reference to the following description when considered in connection with the accompanying drawing, in which Figure 1, is a fragmentary top view of the driving wheel end of the running gear of a motor vehicle showing a brake-operating device embodying my invention applied thereto;

Fig. 2, is an enlarged top view of the principal parts of the brake-operating attachment, removed from the running gear; and Figs. 3, 4 and 5 are cross-sections taken on the lines 3—3, 4—4 and 5—5 respectively of Fig. 2.

In illustrating my invention I have taken as an example its application to a Ford motor car for operating service brakes on the driving wheels. In this embodiment the principal parts making up my invention are applied as an attachment to the running gear, as for example, to the drive shaft tube or torque tube as it is commonly known, designated on the drawing by 6. In this case external brake bands 7 are applied to the drive wheels, providing a service brake adapted to be operated by the foot brake pedal. The particular construction of the braking mechanism per se for each drive wheel and the manner in which it is operated by pull rods 8 is not important to the present invention and is here illustrated only in a conventional way because such mechanisms are well known in this art and any of various constructions might be employed.

My invention comprehends the provision of a device interposed between a manually operable part such as a foot pedal and brake-connected parts such as the pull rods 8 for giving an initial increased braking movement for a quick take-up of the slack in the bands and for thereafter giving a reduced brake movement with a consequent increased braking pressure, there being at all times an equalizing of the braking pressure to the brake bands. This is accomplished in the present instance by an organization of parts mounted upon and carried by a supporting bracket designated generally by 9 attached to the torque tube 6. This bracket is simply a flat casting or forging shaped to seat against the under side of said tube and is rigidly clamped thereto by means of one or more U-bolts 11. For simplicity in construction the bracket 9 has formed integrally therewith at its front and rear ends inclined pads 12 by means of which the bracket is properly seated and located on the tube, and a single U-bolt interposed between these pairs of pads is employed for securing the bracket to the tube. On each rear corner of the bracket is pivotally attached at 13 a bell-crank lever designated generally by 14 having a comparatively long outwardly reaching arm 15 connected at its outer end to the adjacent pull rod 8 and having a rearwardly extending shorter arm 16. A metal strap or link 17 connecting the pivot bolts 13 below said levers serves to strengthen the support therefor and to hold the pivot bolts or rivets in parallelism and also to provide a guide member for a pull rod or bar 18. This pull rod, interposed between the levers 14 at its sides and the bracket 9 and guide strap 17 at its top and bottom, is free to slide lengthwise with respect to the bracket 9 and to swing or rock laterally with respect thereto by fulcruming against either lever 14. Said pull rod 18 will be connected by any suitable means to a brake pedal (not shown) or any suitable manually operable member for operating the brakes, said rod having at present the laterally offset forward end which connects by means of a rod 19 to the foot pedal. The rear end of said pull rod 18 is connected to the rear ends of the lever arms 16 by links 21 which provide a double toggle-joint or lazy-tongs structure. For simplicity in construction, one link is positioned above and the other below the rod or bar 18 and concentrically connected thereto by means of a rivet 22 providing a pivotal connection. Each link is pivotally connected at its opposite end at 23 to the rear or outer end of the adjacent arm 16. These links are preferably of the same length as the link 17 and have their openings similarly located so that the links are interchangeable with a view to facilitating construction and assembling of the equalizer.

By reason of the foregoing construction the pressure exerted by the forward pull on the rod 18 by pressure on the foot pedal or the equivalent, will be increased by the action of the toggle joint so that a powerful brake applying pressure may be exerted by comparatively little manual effort. The equalizer gives a cushioned operation of the foot pedal, that is, the pedal gives easily upon first pressure but the resistance builds up until a point is reached where the wheels are locked. The initial light pressure is accompanied with a considerable movement of the brake rods and the only resistance met with is that incident to the taking-up of the slack of the brake bands. An inspection of Fig. 2 will show that as the rod 18 is first pulled the toggle linkage will afford a relatively angular movement of the bell-crank levers 14, but as the links 21 approach closer and closer to aligned relation a given movement of the rod produces less and less angular movement of the bell-crank levers. This is ideal from the standpoint of affording increasing braking pressure the farther the pedal is depressed. The parts are proportioned so that the first one-fourth inch movement of the foot pedal gives a three-fourths inch movement on the cams at the end of the brake rods; the next one-eighth inch movement gives a one-fourth inch movement of the brake cams; the next one-eighth gives one-eighth inch movement, and the next one-eighth gives one-sixteenth inch movement. The advantages of this operation will be apparent. The mechanical advantage builds up at the time it is most needed up to a point where it is possible to lock the wheels. Furthermore, by reason of the double toggle joint an equalizing action is obtained whereby the force will be equally divided between and applied to the brake bands so that the braking action will be substantially uniform on both wheels even though the hand adjustments differ. By employing short and long lever arms on the bell-cranks in a ratio roughly of 1 to 2 for translating the motion from the equalizer to the pull rods 8 the brake-applying motion is increased with the result that only a short movement of the pull rod 18 is required. This proportioning of the lever arms together with the toggle links function to produce the novel operation above described. This organization of parts is exceedingly simple and practical and serves the above-mentioned purposes in a very satisfactory manner.

It will be manifest that the braking attachment is easy to apply or install on the running gear of the vehicle for the reason that only a single U-bolt is necessary for securing the lever supporting bracket and its connected parts to the torque tube and for the further reason that all slackness in the connections either forward or rearward of said bracket may be taken up by adjustment of the bracket on the tube.

It is believed that the foregoing conveys a clear understanding of the objects prefaced above and while I have illustrated but a single working embodiment it should be understood that changes might be made in details of construction without departing from the spirit and scope of the invention as expressed in the appended claims, in which

I claim:

1. A brake operating attachment of the character described comprising in combination a supporting bracket, a pair of bell-crank levers pivotally mounted on said bracket at the opposite sides thereof, each lever having a relatively long arm extending outwardly from its pivot and a relatively short arm extending rearwardly therefrom, the long arms having connection with brake mechanisms on a pair of wheels, a pull bar interposed between said levers arranged for manual operation, and a pair of links pivotally connected to said bar and having pivotal connection with the short arms of said bell-crank levers, the pivotal connection of said links with said pull bar being substantially to one side of a line passing through the pivotal connections of said links with said short arms.

2. In a brake-operating mechanism, in combination, a pair of brake-connected levers for a pair of separate wheels, a manually operable pull rod, and a double toggle-joint connection between said rod and levers whereby brake pressure increasing and equalizing is secured for the brakes of the two wheels by a pull on said rod.

3. A brake-operating attachment for motor vehicles comprising, in combination, a supporting bracket, means for attaching the bracket to a driving shaft tube, a pair of levers pivoted on said bracket, each adapted for operating one of the brakes, a manually operable pull rod, and a double toggle-joint connection between said pull rod and levers whereby brake pressure increasing and equalizing is secured.

4. A brake-operating attachment of the character described comprising, in combination, a supporting bracket, a pair of bell-crank levers pivoted thereon, a pull bar interposed between said levers, and a toggle connection between said pull bar and levers, said attachment being adapted to be interposed in connections between a foot pedal and brake bands on the driving wheels for transmitting brake pressure increasing and equalizing by pressure on and movement of the foot pedal.

5. A brake-operating attachment of the character described comprising, in combination, a bracket adapted to seat against a driving shaft tube, a U-bolt adapted to embrace said tube and secure the bracket thereto, a pair of bell-crank levers pivotally mounted on the bracket each on an opposite side thereof, each lever having an outwardly extending brake-connected arm and a rearwardly extending arm, a pull rod interposed between said levers, and a link connecting each rearwardly extending lever arm to said pull rod so as to provide a pressure-increasing and equalizing connection between said pull rod and levers.

6. A brake-operating attachment of the character described comprising, in combination, a supporting bracket, a pair of bell-crank levers pivotally mounted on said bracket on opposite sides of a center line, each lever having an arm extending outwardly from its pivot and an arm extending rearwardly therefrom, each outwardly extending arm having a connection with a brake mechanism, a pull bar interposed between said levers and slidable in a plane substantially parallel with said center line, said pull bar being operable by a foot pedal, and a pair of links, each connecting the rear end of one of said levers to the pull bar, said links being pivotally connected each to the rear end of the rearwardly extending arm of one of said levers and concentrically pivotally connected to the rear end of the pull bar.

7. A brake operating attachment of the character described comprising in combination a supporting bracket, a pair of bell-crank levers pivoted at opposite sides of said bracket and extending in opposed relation therefrom, a link connecting the pivotal connections of said levers, a pull bar operating between said bracket and said link between said levers, said levers comprising outwardly extending arms and rearwardly extending arms, the rearward end of said pull bar lying between said rearwardly extending arms, and a pair of links pivotally connecting the end of said pull bar with the ends of said rearwardly extending arms.

8. A brake operating attachment of the character described comprising in combination a supporting bracket, a pair of bell-crank levers pivoted at opposite sides of said bracket and extending in opposed relation therefrom, a pull bar operating between said levers, said levers comprising outwardly extending arms and rearwardly extending arms, the rearward end of said pull bar lying between said rearwardly extending arms, and a pair of links pivotally connecting the end with said pull bar with the ends of said rearwardly extending arms, the ratio of the length of said rearwardly extending and said outwardly extending arms being approximately one to two.

9. A brake operating attachment of the character described comprising in combination a supporting bracket, a pair of bell-crank levers pivoted at opposite sides of said bracket and extending in opposed relation therefrom, a link connecting the pivotal connections of said levers, a pull bar operating between said bracket and said link between said levers, said levers comprising outwardly extending arms and rearwardly extending arms, the rearward end of said pull bar lying between said rearwardly extending arms, and a pair of links pivotally connecting the end of said pull bar with the ends of said rearwardly extending arms, the last mentioned links being approximately of the same length as the link connecting the pivotal connections of said levers.

FRANK C. FRANZEN.